JOHN G. ERDMAN,
COURT L. WOLFE,
GUSTAVE A. SILL,
INVENTORS.

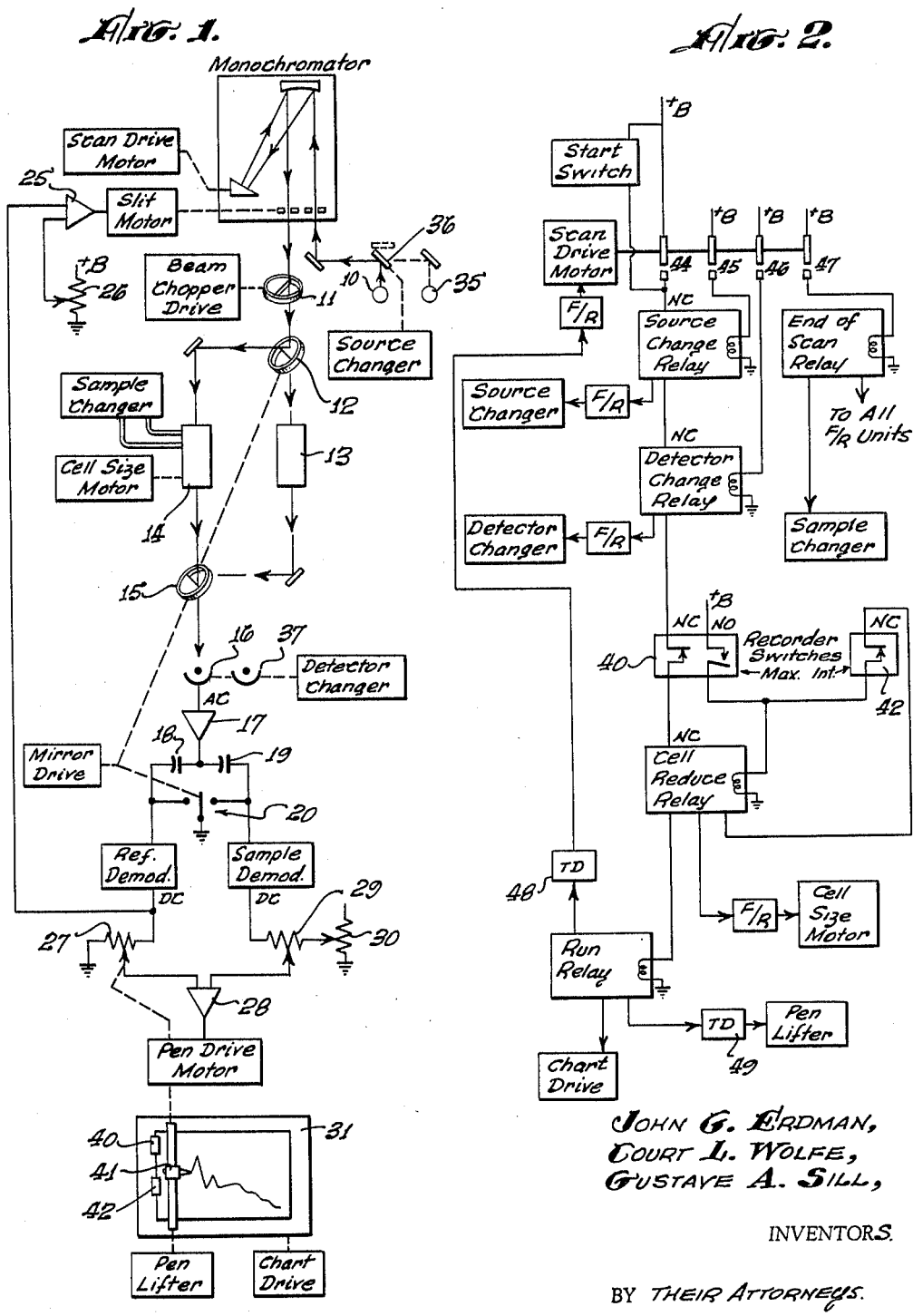

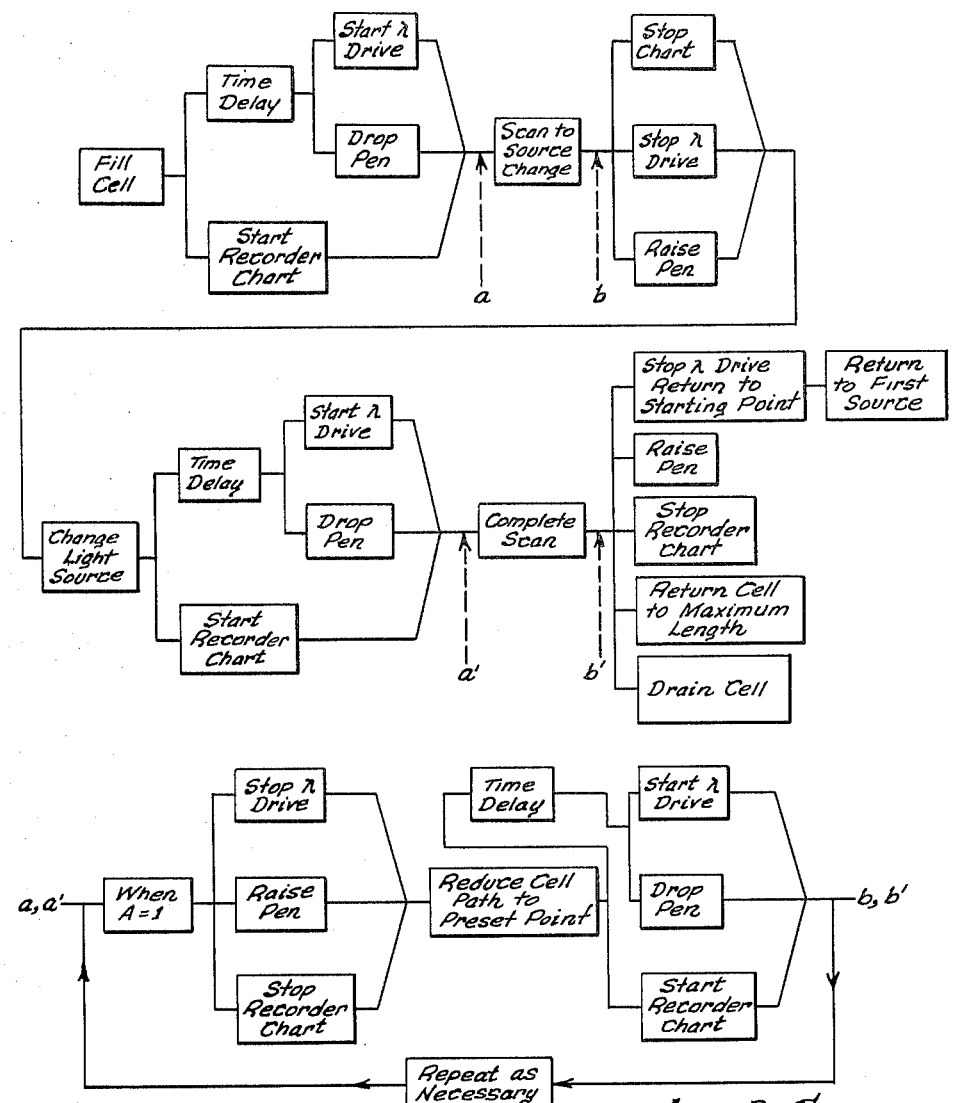

BY THEIR ATTORNEYS.

HARRIS, KIECH, RUSSELL & KERN.

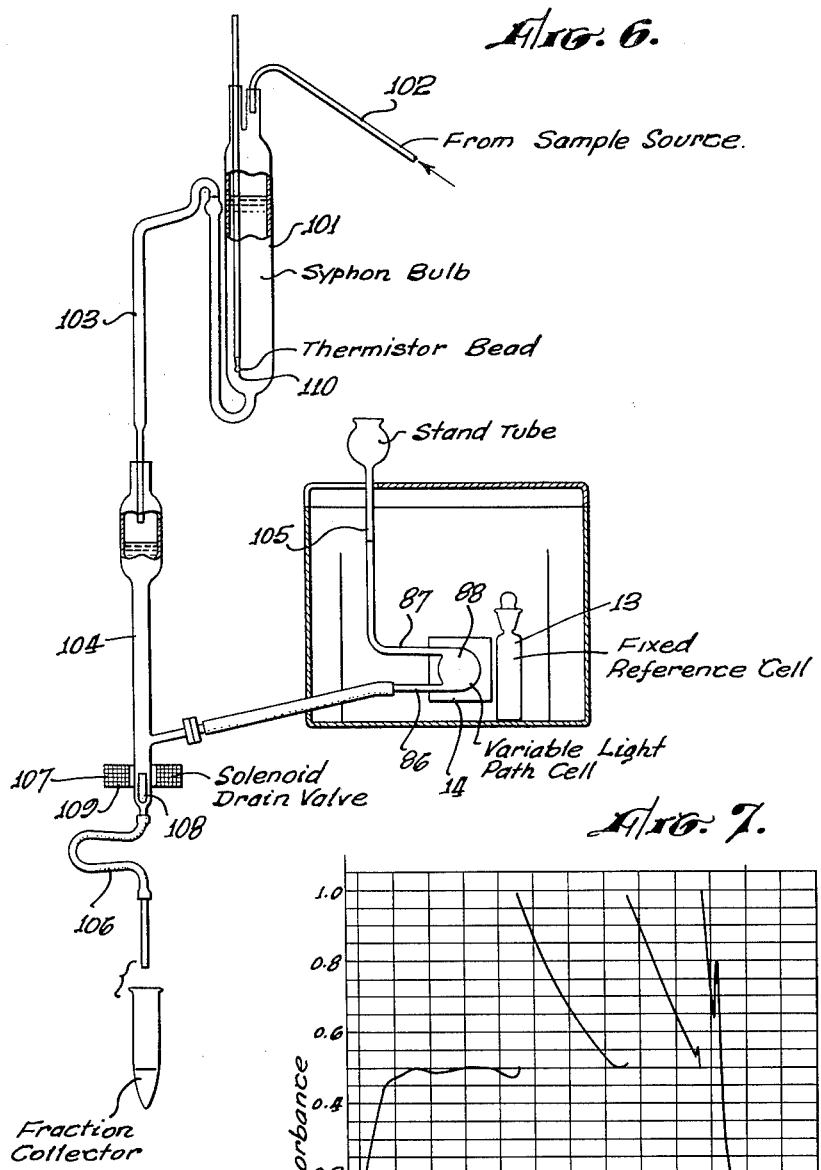

United States Patent Office 3,257,562
Patented June 21, 1966

3,257,562
AUTOMATIC SPECTRAL SCANNING SYSTEM
John G. Erdman, Allison Park, Court L. Wolfe, Ross Township, Allegheny County, and Gustave A. Sill, Wilkins Township, Allegheny County, Pa., assignors, by mesne assignments, to Beckman Instruments, Inc., Fullerton, Calif., a corporation of California
Filed Dec. 26, 1962, Ser. No. 246,945
13 Claims. (Cl. 250—218)

This invention relates to spectrophotometers and, in particular, to automatically operating spectrophotometers and methods of measuring spectral characteristics of samples.

It is an object of the invention to provide apparatus and methods for the spectral analysis of large numbers of samples of widely differing characteristics. A further object is to provide such apparatus and methods which are automatic and which do not require attendance by an operator.

Spectral analysis instruments usually operate best within limited sensitivity ranges and in analyzing samples wherein characteristics vary widely, operator attendance is ordinarily required to maintain the instrument within the desired operating range. Also, it is often desirable to provide analyses of a series of samples which are received from processes or other sources at regular or irregular intervals and operator attendance is normally required to ready the instrument for an analysis and to initiate the analysis at the appropriate time.

It is an object of the present invention to provide a spectrophotometer which will automatically analyze a sample and automatically modify a parameter of the instrument when a recorded value exceeds the instrument capability. A further object is to provide a spectrophotometer which will automatically analyze a series of samples as received at regular or irregular intervals. An additional object is to provide new and novel methods of analyzing samples incorporating automatic analyzer parameter control and incorporating automatic handling of successive samples.

It is a particular object of the invention to provide a spectrophotometer for measuring and recording spectral characteristics of a sample and including a recorder with a chart and chart marker, a sample cell with a variable radiation path length, drive means for varying the path length of the cell, first and second control switches on the recorder with the first switch positioned for actuation by the chart marker when adjacent the upper limit of the chart and with the second switch positioned for actuation by the chart marker when at a predetermined intermediate location on the chart, and a control circuit for energizing the cell drive means to reduce the path length when the first switch is actuated and to terminate path length reduction when the second switch is actuated. A further object is to provide such an instrument incorporating automatic and integrated control for the chart drive, the chart marker, and the wavelength scan.

It is an object of the invention to provide a new and novel sample cell for a spectrophotometer including parallel fixed and moving cell walls with one wall movable along a path normal to the plane of the walls, a reversible motor for driving the movable cell walls, and means for controlling the motor to vary the sample path length in predetermined ratios to provide parameter control for the analysis instrument.

It is an object of the invention to provide a spectrophotometer for measuring and recording spectral characteristics of a series of samples and including a sample cell, fill means for transferring a sample to the cell, start means for generating an analysis start signal, wavelength drive means for scanning the cell incident radiation over a spectrum on receipt of the start signal and including means for generating a reset signal at the completion of a scan and restoring the drive means to its initial position, circuit means for connecting the start signal to the drive means, drain means for moving sample from the cell on receipt of the reset signal, and circuit means for connecting the reset signal to the drain means. A further object is to provide such an instrument in which the cell filling and analysis may be initiated by a manually controlled member, by a timer providing sampling and analysis at predetermined intervals, or by a sample collector which automatically initiates a cycle when an adequate quantity of sample is accumulated.

It is an object of the invention to provide a spectrophotometer incorporating an automatic sample changing system including a sample cell having a pair of inlets, a standpipe connected to one of the cell inlets, a supply line connected to the other of the cell inlets, a sample container for collecting a quantity of sample from the sample source, and a siphon line connecting the sample container to the supply line for automatically transferring the contents of the container into the supply line when the container is filled to a predetermined amount. A further object is to provide such an instrument including means for generating an analysis start signal when the container is emptied into the supply line. An additional object is to provide such an instrument incorporating a drain valve in the supply line for draining the sample from the cell and line at the completion of the scan.

The invention also comprises novel details of construction and novel combinations and arrangements of parts, which will more fully appear in the course of the following description. The drawings merely show and the description merely describes preferred embodiments of the present invention which are given by way of illustration or example.

In the drawings:

FIG. 1 is a diagrammatic illustration of a preferred form of the spectrophotometer of the invention;

FIG. 2 is a schematic diagram of the electrical system of the instrument of FIG. 1;

FIG. 3 is a diagram illustrating the step-by-step operation of the instrument of FIG. 1;

FIG. 6 is a side view of an automatic sample changing apparatus for use with the instrument of the invention; and FIG. 7 is a chart illustrating the analysis record produced by the instrument of the invention.

Figure 4:
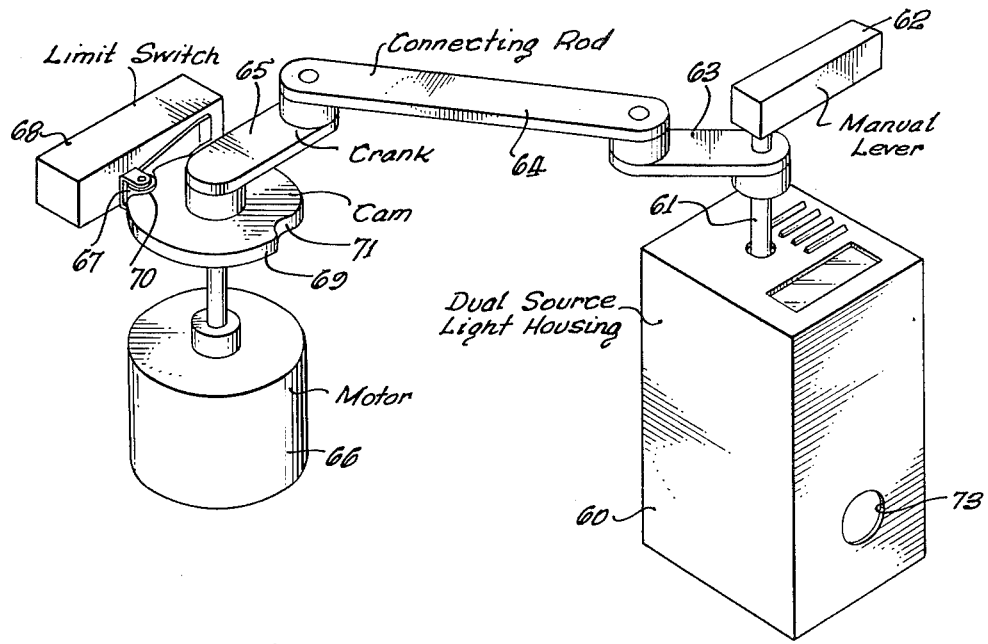
FIG. 4 is a perspective illustration of the source changing mechanism.

The invention is illustrated herein as used with a dual beam ratio recording spectrophotometer with a prism monochromator but it is understood that the invention is equally suitable for use with other forms of spectrophotometers.

Referring to FIG. 1, radiation from a source 10 is directed through mirrors to the entrance slit of a monochromator. The beam from the exit slit of the monochromator is directed past a beam chopper or modulator 11 to a rotating half mirror 12 which functions as a beam splitter. The beam chopper 11 may be an apertured wheel or disc to modulate the beam at a suitable frequency, ordinarily in the order of 480 cycles per second. The rotating mirror 12 alternately directs the beam through a reference cell 13 and a sample cell 14 to another rotating half mirror 15 driven in synchronism with the mirror 12 by the mirror drive motor.

The recombined beam is directed to a detector 16 with the detector output coupled through an amplifier 17 and capacitors 18, 19 to a reference demodulator and a sample demodulator respectively. A commutator 20 is driven in synchronism with the half mirrors 12, 15 to direct that portion of the eletrical signal resulting from radiation through the reference cell 13 to the reference demodulator and that portion resulting from radiation through the sample cell 14 to the sample demodulator.

The output of the reference demodulator is connected as an input to an amplifier 25 for driving a slit motor to control the width of the monochromator slit. A potentiometer 26 provides a reference voltage input for the amplifier 25. While the monochromator entrance and exit slits are shown side by side in the drawing for purposes of clarity, the entrance and exit beams are usually positioned one above the other so as to utilize a single pair of slit jaws. The reference demodulator output is also connected through the arm of a potentiometer 27 as one input to a differential amplifier 28. The output from the sample demodulator is connected via potentiometers 29, 30 as the other input to the amplifier 28. The amplifier 28 energizes the pen drive or chart marker motor of a recorder 31 with the motor driving the chart marking pen and also the arm of the potentiometer 27 to provide a feedback signal in the servo loop. The recorded value is the ratio of the absorbance of the sample and reference material and of course, the instrument may be used equally well for transmittance measurements. The potentiometer 30 provides for adjustment of the zero or low end of the scale and the potentiometer 29 provides for adjustment of the maximum or high end of the scale of the recorder.

Figure 5:
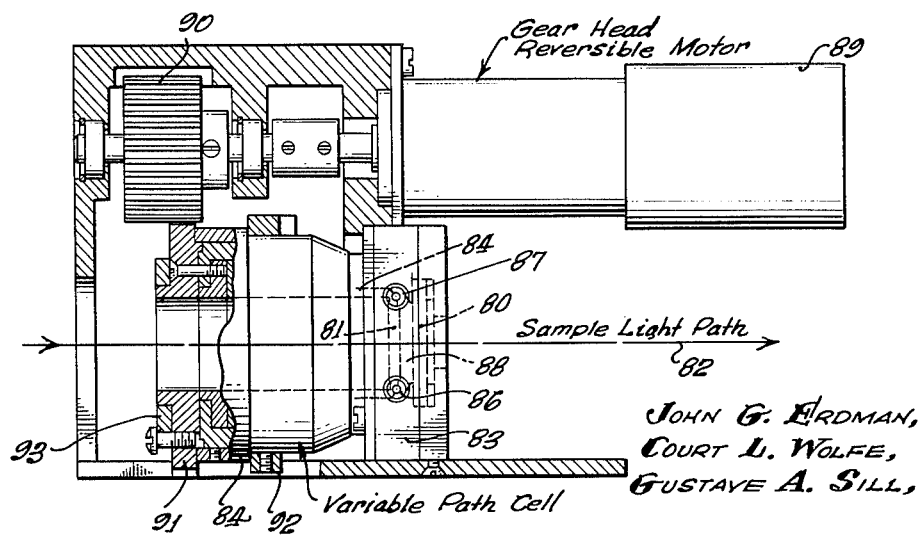
FIG. 5 is a side view partly in section showing a preferred form of the variable cell of the invention.

Another radiation source 35 is provided together with a source changer for selecting one of the sources 10, 35 to provide the incident radiation to the monochromator. In this particular embodiment, the source changer pivots a mirror 36 from the normal position shown in solid lines to the position shown in phantom lines. In an alternative arrangement, the sources could be mechanically moved to interchange their positions. A preferred form of source changer is shown in FIG. 4. A second detector 37 is also provided together with a detector changer which may function in the same manner as the source changer. The prism of the monochromator is rotated by a scan drive motor for scanning the narrow radiation beam from the monochromator over the wider spectrum of the incoming radiation. The sample cell 14 is a variable device for changing the path length through the sample and is driven by a cell size motor. A preferred form of the sample cell is shown in FIG. 5. Means are also provided for automatically changing the sample in the sample cell and a preferred form of sample changer is shown in detail in FIG. 6.

A switch 40 is mounted on the recorder for actuation by the chart marker or pen 41 when the pen reaches the maximum or upper limit of the recorder scale. Another switch 42 is mounted on the recorder for actuation by the pen when at an intermediate position, usually at the midpoint. These switches initiate and terminate the scale changing operation of the instrument and may be made adjustable to set the instrument for any desired operating characteristic. An electrical diagram of the instrument of FIG. 1 is shown in FIG. 2. The scan drive motor which drives the prism of the monochromator also drives four cams for actuating switches 44, 45, 46, 47 which in turn control the operating cycle of the instrument. The switch 44 is normally closed and is opened at the zero or initial point of the wavelength scan. The switch 45 is normally open and is closed at the wavelength at which the source is to be changed. The switch 46 is normally open and is closed at the wavelength at which the detector is to be changed. The switch 47 is normally open and is closed at the end of the wavelength scan.

With the instrument in its initial condition at the beginning point of the wavelength scan, all four switches 44–47 are open. A power source, here indicated as +B, is by-passed around the switch 44 by the start switch.

Actuation of the start switch connects power through a normally closed set of contacts of the source change relay and a normally closed set of contacts of the detector change relay and a normally closed set of contacts of the recorder maximum switch 40 and a normally closed set of contacts of the cell reduce relay to the run relay. Actuation of the run relay starts the chart drive, starts the scan drive motor through a time delay unit 48, and actuates the pen lifter through another time delay unit 49 to move the pen into contact with the chart. The instrument operates in its normal manner until the switch 45 is closed calling for a change in radiation source. Closing of the switch 45 actuates the source change relay to temporarily open the line to the run relay and to energize the source changer. When the run relay is de-energized, the chart drive is stopped, the pen is raised from the chart, and the scan drive is stopped. After the source change is completed, the run relay is again energized and the analysis is continued. A similar operation occurs when the switch 46 is closed at the point at which a change in detector is desired.

At the end of the wavelength scan, the switch 47 is closed to energize the end of scan relay which in turn actuates the sample changer and all of the forward-reverse units causing the scan drive motor to return to the initial wavelength point, the source changer to return to the first source, and the detector changer to return to the first detector. The cell size motor is also caused to return to the initial cell size. The instrument is now ready for another analysis which is initiated by actuation of the start switch by any of several modes to be described subsequently.

If during the analysis, the signal being recorded reaches the scale maximum, the switch 40 is actuated by the marker pen 41 to close the normally open set of contacts of the switch 40 and energize the cell reduce ready. Energization of the cell reduce relay temporarily opens the line to the run relay, energizes the cell size motor, and energizes a holding circuit through the normally closed set of contacts of the switch 42. Operation of the cell size motor produces a reduction in the path length through the sample cell and thereby a reduction in the recorded signal causing the chart marker pen to move downscale until the switch 42 is actuated. Actuation of switch 42 opens the normally closed contacts and de-energizes the cell reduce relay stopping operation of the cell size motor and energizing the run relay to continue the analysis. With this mode of operation, the instrument may be set for a relatively high sensitivity. Then when a recorded signal reaches the limit and would normally go off scale, the sensitivity is reduced by a predetermined factor and the analysis and recording continues. The cell size reduction operation may take place any number of times during the analysis of a sample, depending upon the maximum value of the signal to be recorded. At the end of the analysis, the instrument is restored to the initial sensitivity by running the cell size motor in the reverse direction to attain the initial cell size.

FIG. 3 illustrates the step-by-step operation of the instrument during an analysis. The sample cell is filled and the recorder chart is started. After a short time delay, the wavelength drive scan is started and the pen is dropped to the recorder chart. The analysis continues until the source change wavelength is reached at which time the chart and wavelength drive are stopped and the pen is raised. Then the light source is changed and the analysis continues to the end of the wavelength scan or alternatively to the wavelength at which the detector change occurs. The detector change operation is the same as the light source change operation. At the end of the scan, the wavelength drive and recorder chart are stopped, the pen is raised, the wavelength drive, source, detector, and cell are returned to the initial conditions, and the cell is drained. When during an analysis the recorded signal reaches the scale limit, i.e., when absorbance equals one in an absorbance measurement, the scale change cycle is initiated. This would occur at *a–b* and *a'–b'*. During the scale change cycle, the wavelength drive and recorder chart are stopped and the pen is raised from the recorder. Then the beam path in the cell is reduced to the preset ratio after which the wavelength drive and recorder chart are started and the pen is engaged with the chart. As the scan continues, it may be necessary to repeat the scale change cycle one or more times.

In the source changer shown in FIG. 4, the two sources are positioned in a housing 60. The mirror 36 is pivoted by the shaft 61 either manually by lever 62 or automatically via lever 63, connecting rod 64, crank arm 65 and motor 66. The motor 66, typically a gear head reversible motor, drives the linkage from the position shown in FIG. 4 with the roller 67 of switch 68 engaging the cam 69 at concave section 70, to the reverse position with the roller engaging the cam at the concave section 71. The motor is energized from the source change relay (FIG. 2) and the switch 68 is connected in the motor control circuit to limit the travel and indicate the end of the change cycle. As indicated in FIG. 1, the mirror 36 is pivoted to one position to direct the radiation from the source 10 out through the opening 73 and is pivoted to a second position to permit the radiation from the other source 35 to pass out through the opening 73.

The variable cell of FIG. 5 includes a fixed wall 80 and a movable wall 81 disposed parallel to each other and normal to the light path 82. The fixed wall 80 is carried in the cell housing 83 and the movable wall is carried in the tubular member 84 that is translated in the housing along the path 82 by rotation of the outer member 84. Inlets 86, 87 provide for fluid flow into the sample zone 88 of the cell. A reversible gear head motor 89 is mounted on the housing for driving the member 84 via gears 90, 91. A collar 92 carried on the rotating member 84 engages a limit switch (not shown) for controlling the minimum size of the cell and another collar 93 engages a similar limit switch for controlling the maximum size of the cell to prevent mechanical damage to the device. As indicated in FIG. 2, the motor 89 is controlled by the cell reduce relay and the recorder switches 40, 42 with the magnitude of reduction of cell size and hence path length being controlled by the output signal at the recorder.

FIG. 6 illustrates apparatus for automatically filling and emptying the sample cell and generating the analysis start signal. Sample from a sample source is directed into a siphon bulb or collector 101 through a line 102. A siphon line 103 provides for sample flow to a supply line 104 which is connected to an inlet 86 of the sample cell 14. A standpipe 105 open at its upper end to the atmosphere is connected to the other inlet 87 of the sample cell. The lower end of the supply line 104 is connected to a drain line 106 with flow thereto controlled by a valve 107. The drain valve may take various standard forms and is shown herein as comprising an armature 108 within the supply line and an encircling solenoid 109.

At the end of an analysis, the solenoid 109 is energized permitting the sample to drain from the standpipe 105, the sample cell and the supply line 104 through the line 106 to waste or a suitable collector. Then the solenoid is de-energized, closing the drain valve. Sample from the source collects in the container 101 until sufficient sample is accumulated to start siphon draining of the collector into the supply line. Sample flows into the sample cell and partway up the standpipe providing a flushing action in the cell. When the fluid level in the container 101 falls below the level of a thermistor bead 110, the resulting change in temperature of the bead provides an electrical signal for initiating the analysis. Typically, the thermistor bead may be connected in an amplifier circuit which actuates a relay to close the start switch of FIG. 2. At the end of the analysis, the sample is drained from the cell and the instrument is returned to the initial position as described previously. When the container 101 is again filled with sample, the analysis cycle is automatically repeated.

Sample may be fed continuously from the source through the line 102 or may be supplied by manual or automatic or timer-operated sampling devices. Also, a manually-operated switch or a timer-operated switch or the like may be used as the start switch. In an alternative form, the drain line 106 and valve 107 may be omitted and the analysis of sample may be flushed out through the inlet 87 by a new sample.

A typical record produced by the instrument is shown in FIG. 7. Here the instrument was used in measuring absorbance of a sample over a wavelength scan of 600 millimicrons to 250 millimicrons. In FIG. 7, the chart paper was moved to the right, resulting in a trace which moved to the left. The scan started at 600 millimicrons and produced a first absorbance peak of about 0.8 at wavelength $W_1$. At wavelength $W_2$, the recorder reached the scale limit of absorbance equal to one. At this point, the switch 40 was actuated, the analysis stopped, and the cell size motor energized to reduce the recorder signal to 0.5, after which the analysis was continued. At wavelength $W_3$, the source change operation occurred producing a slight discontinuity in the trace. Scale reductions occurred again at wavelength $W_4$ and at wavelength $W_5$ and the analysis terminated at 250 millimicrons. In this particular analysis, the magnitude of the recorded signal was reduced by a factor of two at each scale reduction and, knowing this ratio, the characteristic for any point in the spectrum is available.

The instrument described herein provides spectral scanning of large numbers of samples of widely different absorbances or transmittances without attendance by an operator. An analysis cycle may be started and terminated automatically with the sample cell being filled and emptied. The sensitivity of the system is adjusted automatically so that the recorded data is always within a meaningful range.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a spectrophotometer for measuring and recording spectral characteristics of a sample and including a recorder with a chart and chart marker, the combination of:
   a sample cell with a variable radiation path length;
   drive means for varying the path length of said cell;
   first and second control switches on said recorder, with said first switch positioned for actuation by said chart marker when adjacent the upper limit of said chart and with said second switch positioned for actuation by said chart marker when at a predetermined intermediate location on said chart; and
   a control circuit for energizing said drive means to reduce said path length when said first switch is actuated and to terminate path length reduction when said second switch is actuated.

2. In a spectrophotometer for measuring and recording spectral characteristics of a sample and including a recorder with a chart and chart marker, the combination of:
   a sample cell with a variable radiation path length;
   cell drive means for varying the path length of said cell;
   chart drive means for driving said recorder chart;
   chart marker control means for moving said chart marker to and from a chart marking position;
   first and second control switches on said recorder, with said first switch positioned for actuation by said chart marker when adjacent the upper limit of said chart and with said second switch positioned for actuation by said chart marker when at a predetermined intermediate location on said chart; and a control circuit having a first condition for de-energizing said chart drive means, moving said chart marker from the chart marking position and energizing said cell drive means to reduce said path length when said first switch is actuated, and having a second condition for terminating path length reduction, energizing said chart drive means and moving said chart marker to the chart marking position when said second switch is actuated.

3. In a spectrophotometer for measuring and recording spectral characteristics of a sample during a wavelength scan and including a recorder with a chart and chart marker, the combination of:

a sample cell with a variable radiation path length;
cell drive means for varying the path length of said cell;
chart drive means for driving said recorder chart;
chart marker control means for moving said chart marker to and from a chart marking position;
wavelength drive means for scanning the cell incident radiation over a spectrum;
first and second control switches on said recorder, with said first switch positioned for actuation by said chart marker when adjacent the upper limit of said chart and with said second switch positioned for actuation by said chart marker when at a predetermined intermediate location on said chart; and
a control circuit having a first condition for de-energizing said chart and wavelength drive means, moving said chart marker from the chart marking position and energizing said cell drive means to reduce said path length when said first switch is actuated, and having a second condition for terminating the path length reduction, energizing said chart and wavelength drive means and moving said chart marker to the chart marking position when said second switch is actuated.

4. In a spectrophotometer for measuring and recording spectral characteristics of a series of samples received from a sample source, the combination of:

a sample cell;
a sample container for collecting a sample from the sample source;
fill means for automatically transferring a sample from said container to said cell when a predetermined quantity of sample is collected;
means for generating an analysis start signal when sample is transferred to said cell;
wavelength drive means for scanning the cell incident radiation over a spectrum on receipt of said start signal and including means for generating a reset signal at the completion of a scan and restoring said drive means to its initial position;
circuit means for connecting said start signal to said drive means;
drain means for moving sample from said cell on receipt of said reset signal; and
circuit means for connecting said reset signal to said drain means.

5. In a spectrophotometer for measuring and recording spectral characteristics of a series of samples received from a sample source and including a recorder with a chart and chart marker, the combination of:

a sample cell;
chart drive means for driving said recorder chart;
chart marker control means for moving said chart marker to and from a chart marking position;
a sample container for collecting a sample from the sample source;
fill means for automatically transferring a sample from said container to said cell when a predetermined quantity of sample is collected;
means for generating an analysis start signal when sample is transferred to said cell;
wavelength drive means for scanning the cell incident radiation over a spectrum on receipt of said start signal and including means for generating a reset signal at the completion of a scan and restoring said drive means to its initial position;
circuit means for connecting said start signal to said wavelength and drive means and said marker control means to start said drive means and move said marker to the marking position;
drain means for moving sample from said cell on receipt of said reset signal; and
circuit means for connecting said reset signal to said drain means, said chart drive means and said marker to stop said chart drive means and move said marker from the marking position.

6. In a spectrophotometer for measuring and recording spectral characteristics of a series of samples received from a sample source and including a recorder with a chart and chart marker, the combination of:

a sample cell with a variable radiation path length;
cell drive means for varying the path length of said cell;
a sample container for collecting a sample from the sample source;
fill means for automatically transferring a sample from said container to said cell when a predetermined quantity of sample is collected;
means for generating an analysis start signal when sample is transferred to said cell;
wavelength drive means for scanning the cell incident radiation over a spectrum on receipt of said start signal and including means for generating a reset signal at the completion of a scan and restoring said drive means to the initial positions;
circuit means for connecting said start signal to said wavelength drive means;
first and second control switches on said recorder, with said first switch positioned for actuation by said chart marker when adjacent the upper limit of said chart and with said second switch positioned for actuation by said chart marker when at a predetermined intermediate location on said chart;
a control circuit for energizing said cell drive means to reduce said path length when said first switch is actuated and to terminate path length reduction when said second switch is actuated;
drain means for moving sample from said cell on receipt of said reset signal; and
circuit means for connecting said reset signal to said drain means.

7. In a spectrophotometer for measuring and recording spectral characteristics of a series of samples received from a sample source, the combination of:

a sample cell;
fill means for transferring a sample to said cell;
start means for generating an analysis start signal;
wavelength drive means for scanning the cell incident radiation over a spectrum on receipt of said start signal and including means for generating a reset signal at the completion of a scan and restoring said drive means to its initial position;
circuit means for connecting start signal to said drive means;
drain means for moving sample from said cell on receipt of said reset signal; and
circuit means for connecting said reset signal to said drain means.

8. An instrument as defined in claim 7 in which said start means includes a manually actuated control means.

9. An instrument as defined in claim 7 in which said start means includes a control member automatically actuated by a timer.

10. An instrument as defined in claim 7 in which said start means includes a control member actuated by the transfer of sample to said cell.

11. In a spectrophotometer for measuring and recording spectral characteristics of a series of samples received from a sample source and including a recorder with a chart and chart marker, the combination of:
  a sample cell with a variable radiation path length;
  cell drive means for varying the path length of said cell;
  fill means for transferring a sample to said cell;
  start means for generating an analysis start signal;
  wavelength drive means for scanning the cell incident radiation over a spectrum on receipt of said start signal and including means for generating a reset signal at the completion of a scan and restoring said drive means to the initial positions;
  circuit means for connecting said start signal to said wavelength drive means;
  first and second control switches on said recorder, with said first switch positioned for actuation by said chart marker when adjacent the upper limit of said chart and with said second switch positioned for actuation by said chart marker when at a predetermined intermediate location on said chart;
  a control circuit for energizing said cell drive means to reduce said path length when said first switch is actuated and to terminate path length reduction when said second switch is actuated;
  drain means for moving sample from said cell on receipt of said reset signal; and
  circuit means for connecting said reset signal to said drain means.

12. A spectral scanning system for measuring and recording spectral characteristics of a sample comprising:
  a sample cell with a variable radiation path;
  drive means for varying the path length of said cell;
  means for dispersing radiation from a source and scanning the cell incident radiation over a spectrum;
  means for measuring the spectral characteristics of said sample and providing an output signal varying as a function thereof;
  recorder means having said output signal as the input thereof and recording said spectral characteristics on a chart;
  circuit means for energizing said drive means to reduce said path length upon occurrence of a first spectral characteristic and to terminate path length reduction upon occurrence of a second spectral characteristic.

13. A spectral scanning system for measuring and recording spectral characteristics of a plurality of samples in sequence comprising:
  a sample cell having a variable radiation path;
  cell drive means for varying the path length of said cell;
  a sample container for collecting a sample from a sample source;
  fill means for automatically transferring the collected sample from said container to said cell when a predetermined quantity of sample is collected;
  means generating an analysis start signal when said sample is transferred to said cell;
  wavelength drive means for scanning the cell incident radiation over a spectrum on receipt of said start signal and including means for generating a reset signal at the completion of a scan and restoring said wavelength drive means and said cell drive means to their respective initial positions;
  circuit means connecting said start signal to said wavelength drive means;
  recorder means recording the spectral characteristics of said sample;
  circuit means interrupting said wavelength drive means and energizing said cell drive means to reduce said path length when a first spectral characteristic is reached and to terminate path length reduction and restart said wavelength drive means when a second spectral characteristic is reached;
  drain means responsive to said reset signal for draining said sample from said cell; and
  circuit means connecting said reset signal to said drain means.

References Cited by the Examiner

UNITED STATES PATENTS

| | | | |
|---|---|---|---|
| 1,806,199 | 5/1931 | Hardy et al. | 88—14 |
| 2,649,011 | 8/1953 | Black | 88—14 |
| 2,690,695 | 10/1954 | Coates | 88—14 |
| 2,864,396 | 12/1958 | Isreeli | 137—132 |
| 2,844,066 | 7/1959 | Friel | 88—14 |
| 3,046,831 | 7/1962 | Isreeli | 88—14 |
| 3,094,134 | 6/1963 | Curree | 137—132 |

FOREIGN PATENTS 517,462   1/1940   Great Britain.

RALPH G. NILSON, *Primary Examiner.*

WALTER STOLWEIN, *Examiner.*

J. D. WALL, *Assistant Examiner.*